J. H. COOKE.
CHAIN.
APPLICATION FILED MAR. 8, 1920.
1,421,915.
Patented July 4, 1922.
2 SHEETS—SHEET 1.
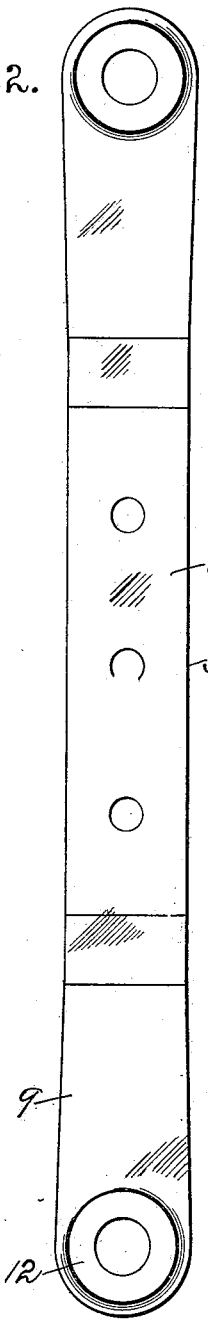
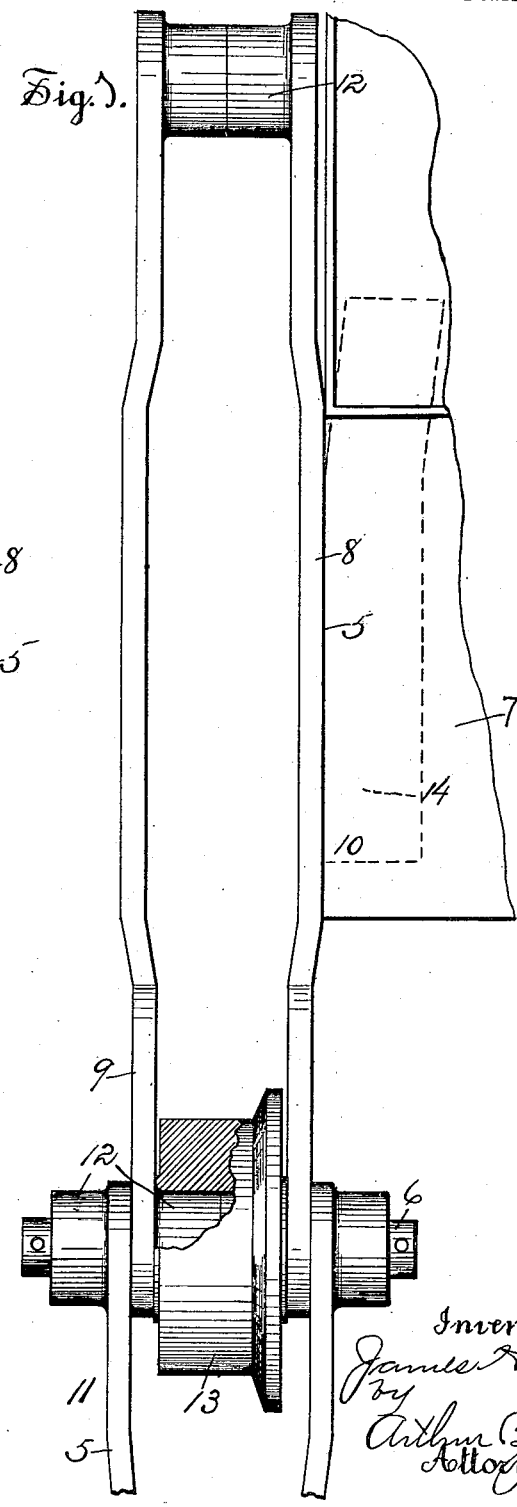

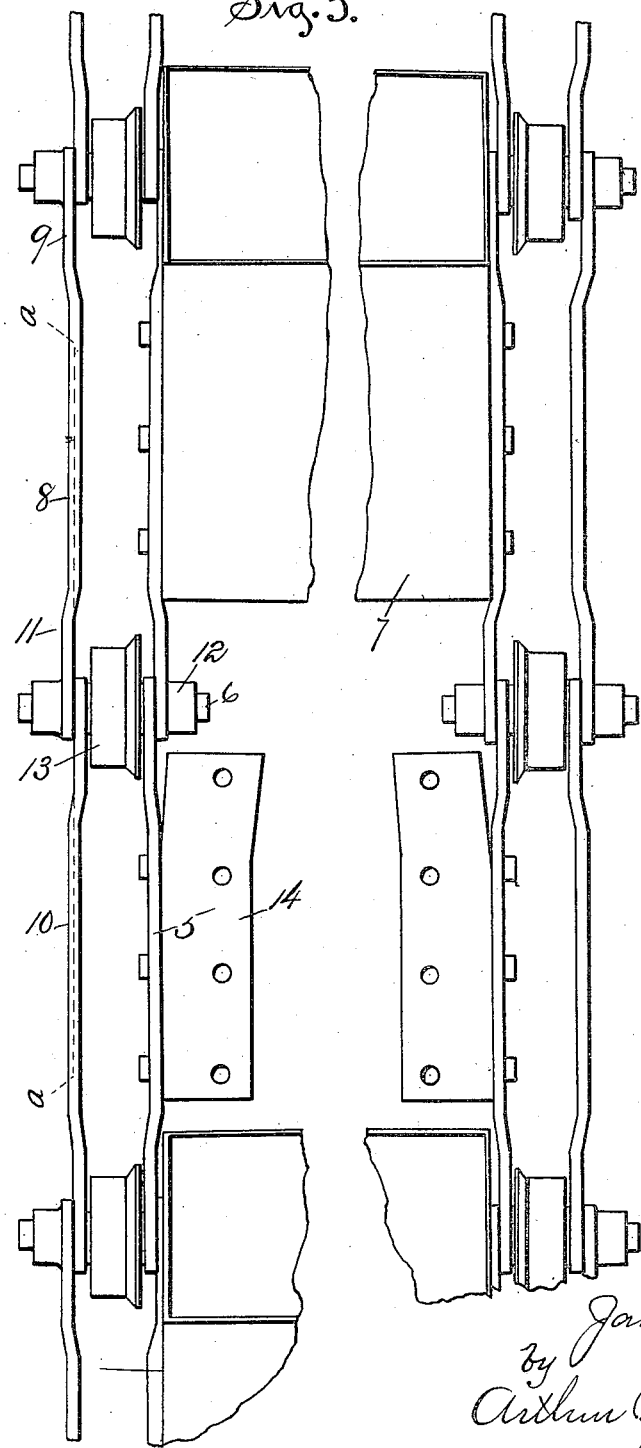

UNITED STATES PATENT OFFICE.

JAMES H. COOKE, OF HARTFORD, CONNECTICUT.

CHAIN.

1,421,915.  Specification of Letters Patent.  Patented July 4, 1922.

Application filed March 8, 1920. Serial No. 364,271.

*To all whom it may concern:*

Be it known that I, JAMES H. COOKE, a citizen of the United States, residing in Hartford, in the county of Hartford and State of Connecticut, have invented new and Improved Chains, of which the following is a specification.

My invention relates to the class of chains that may be called "travelling chains" in that they are supported on and propelled by rotating devices, as a toothed or other wheel, and an object of my invention, among others, is to provide a chain that shall be extremely durable, and one that shall be simple in its construction.

One form of chain embodying my invention and in the construction and use of which the objects herein set out, as well as others, may be attained, is illustrated in the accompanying drawings, in which—

Figure 1 is an edge view of a portion of a chain embodying my invention with a portion of a bucket indicated in dotted outline as attached thereto.

Figure 2 is a side view of my improved chain link member.

Figure 3 is a plan view, scale reduced, of a plurality of chain links composed of my improved chain member and illustrating the alignment of such members owing to the peculiar form thereof.

My improved chain has links of peculiar construction particularly adapting it for use in chains of large pitch, as embodied in elevators equipped with buckets of large size carrying heavy material of a gritty nature, and while it is not confined to a chain employed for any specific purpose, yet as it is readily adapted to a chain of the character above described, such chain has been selected by me for the purpose of illustrating my invention in the drawings herein, and that commonly comprises two side members composed of a series of links with buckets or other carrying devices supported between them. These links, in my improved chain, are each formed of two members 5, that are duplicates each of the other, with a pin 6 passing through them at each end as a means for connecting adjacent links. When such a chain is composed of two side members buckets 7 may be supported between them in any suitable manner.

My improved link member, that is shown of full size in the drawings, has intermediate portions 8 and offset ends 9, the latter being preferably of the same length and the intermediate portions 8 preferably extending to same distance on opposite sides of the lengthwise centers of said members and with their lengthwise center lines located substantially in line with the meeting faces on the offset portions 9 in alternate links. A chain composed of my improved link members embodies narrow links 10 alternately disposed with broad links 11, the ends of the narrow links fitting between the ends of the broader links. In order to provide an extremely durable bearing comprising the link members and pins hereinbefore described, a hub 12 is formed at each end of each link member, the hubs on the narrow links 10 projecting toward and preferably resting against each other and the hubs on the broader links projecting outwardly away from each other. This provides a structure in which the bearing is continuous from the lengthwise center of the pin in both directions and to an extent to afford a very substantial bearing between the pin and link members, which bearing will be amply sufficient to withstand any strains that will be put upon the chain in use.

Another purpose for the hubs 12 is to afford bearings for rollers 13. In the use of chains of this class it is common practice to provide rollers that travel along a rail or like member for the purpose of supporting the chain and its load and in order to increase the durability of my improved chain these rollers are supported on the inwardly projecting hubs of the narrow links that, therefore, serve as bearings for the pins as well as the hubs.

The form of the link member enables its use in a chain throughout, and it is completely interchangeable from any one position to every other position, therein, such chain consequently being of extreme simplicity, and the long bearing and consequent large wearing surface of the roller and pin bearings provides a chain that will resist wear to a maximum degree.

It will be noted that the ends of the link member are so offset that no matter whether forming a wide or a narrow link a line extended along the center of the middle part of any one link member will pass along the center of the middle part of all of the corresponding link members in the chain, and as denoted by the dotted line a—a in Figure 3 of the drawings, consequently the side faces of all the links in a chain member will lie in substantially the same plane, thereby enabling the bucket supports 14 to all be of duplicate construction as well as the buckets 7.

A further advantage of this duplicate and interchangeable construction enables the production of a chain having not only the durability hereinbefore mentioned, but it also enables this durability to be increased from the fact that the link members which are found susceptible to wear in one position may be changed from that position to another position where the element of wear will be less, as for instance, so changing and reversing the links that the hubs, that have been subjected to wear from the rollers on the inside of the members, will be located on the outside of the link members where they will not be subjected to wear, and vice versa.

The structure of the link member is such that said member and also the rollers may be cast to shape, the openings and holes being formed in the casting operation and of sufficient size to require no machining or other finishing, consequently said parts may be made from the hardest metals that will withstand wear to a maximum degree.

In accordance with the provisions of the patent statutes, I have described the principles of operation of my invention, together with the device which I now consider to represent the best embodiment thereof, but I desire to have it understood that the device shown is only illustrative, and that the invention may be carried out by other means.

I claim—

1. A chain link member having its opposite ends offset in the same direction and to the same extent and with the plane of one face of each of said offset portions located substantially in a plane passing centrally through the intermediate portion of the member and parallel with the faces thereof and with roller bearing hubs extending from the same side at opposite ends thereof whereby a chain may be formed composed of links all of duplicate construction.

2. A chain comprised of chain link members all of duplicate construction and each having its opposite ends offset in the same direction and to an extent substantially equal to one-half of the thickness of the link member, the plane of one face of each of said offset portions of each of said members being located substantially in a plane passing centrally through the intermediate portion of the member and parallel with the faces thereof.

3. A chain composed of chain link members all of duplicate construction, each comprising a central portion and end portions offset to the same extent from said central portion with duplicate roller bearing hubs extending from the same side of said offset portions, the faces of said offset ends being located in a plane passing centrally through the intermediate portions of the member and parallel with the faces thereof.

4. A chain comprising links consisting of side members all duplicates each of another, each of which side members has duplicate roller bearing hubs projecting from the same side at opposite ends and toward and resting against the hub on the opposite link, a roller mounted on said hubs, and means for connecting said side members.

5. A chain comprising links consisting of side members each a duplicate of the other, and having opposite ends each a duplicate of the other, each of which side members has a roller bearing hub projecting toward the hub on the opposite link, a roller mounted on said hubs, and means for connecting said side members.

6. A chain comprising links consisting of side members, each of which side members has ends duplicate in construction and offset in the same direction, and said offset ends each having a roller bearing hub projecting from the same side thereof, the hubs on opposing links projecting toward each other, a roller mounted on said hubs, and means for connecting said side members.

7. A chain comprising two sets of links, the members of one set being wider at their ends than the members of the opposite set, all of said links comprising side parts of duplicate construction at opposite ends with roller bearing hubs projecting from the side parts toward each other at the intersection of the links, rollers mounted on said hubs, and means for connecting the side parts.

8. A chain comprising two sets of links, one set of links being wider at its ends than the other and all of said links being composed of side parts duplicates each of the other, the narrow ended links having roller bearing hubs projecting from the side parts toward each other at each end thereof, and the wider ended links having roller bearing hubs at each end thereof projecting in opposite directions, rollers mounted on said hubs between the side parts of the links, and pins passing through said hubs to join each of the link sections.

9. A chain comprising two sets of links, the members of one set being wider at their ends than the members of the opposite set, all of said links comprising side parts of duplicate construction at opposite ends, and means for connecting the side parts of the links.

10. A chain link member having its opposite ends offset to a degree to locate all in the same line the centers of a plurality of said members in adjacent chain links composed entirely of said members.

11. A chain comprising sections, each section being composed of two links all duplicates each of another and each of which is reversible end for end in any place in said section and each of which is reversible edge for edge at some place in said section.

12. A chain comprising two sets of links composed of link members all of duplicate construction with roller bearing hubs projecting inwardly from the members of one link and with roller bearing hubs projecting outwardly from the members of the adjacent link at the joined ends of said links.

JAMES H. COOKE.